US005813942A

United States Patent [19]
Nakagawa et al.

[11] Patent Number: 5,813,942
[45] Date of Patent: Sep. 29, 1998

[54] APPARATUS FOR CONTROLLING AUTOMATIC TRASMISSION DURING DOWNHILL RUNNING OF VEHICLE BY CHANGING A REFERENCE ACCELERATION VALUE

[75] Inventors: Masahiko Nakagawa, Nagoya; Atsuo Okumura, Toyota, both of Japan

[73] Assignee: Toyota Jidosha Kabushiki Kaisha, Toyota, Japan

[21] Appl. No.: 850,004

[22] Filed: May 1, 1997

[30] Foreign Application Priority Data

May 10, 1996 [JP] Japan .................................. 8-116512

[51] Int. Cl.$^6$ ........................ F16H 61/02; F16H 61/10; F16H 61/16
[52] U.S. Cl. ........................ 477/120; 477/901; 477/904
[58] Field of Search .................................... 477/107, 120, 477/901, 904; 701/55

[56] References Cited

U.S. PATENT DOCUMENTS 4,701,853  10/1987  Osanai ................................. 477/120 X
5,129,288  7/1992  Sasaki et al. ........................... 477/120
5,728,026  3/1998  Sakaguchi et al. ................. 477/120 X

FOREIGN PATENT DOCUMENTS 5-149424  6/1993  Japan .
8-28693   2/1996  Japan .

*Primary Examiner*—Khoi Q. Ta
*Attorney, Agent, or Firm*—Oblon, Spivak, McClelland, Maier & Neustadt, P.C.

[57] ABSTRACT

A shift control apparatus for controlling a speed ratio of an automatic transmission of a motor vehicle having an engine during running of the vehicle on a downhill road, on the basis of an actual acceleration value of the vehicle as compared with a reference acceleration value of the vehicle, the apparatus including a device for determining reduction of an actual output of the engine with respect to a desired output of the engine as represented by an operating amount of an accelerator pedal, and a device for reducing the reference acceleration value by a compensating amount which decreases with an increase in the running speed of the vehicle, upon determination of the reduction of the actual output of the engine.

8 Claims, 13 Drawing Sheets

FIG. 2

| SHIFT POSITION | | $C_1$ | $C_2$ | $C_0$ | $B_1$ | $B_2$ | $B_3$ | $B_0$ | $F_1$ | $F_2$ | $F_0$ |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | ○ | ○ | ○ | | | ◎ | | ◎ |

$(\beta < \alpha)$

APPARATUS FOR CONTROLLING AUTOMATIC TRASMISSION DURING DOWNHILL RUNNING OF VEHICLE BY CHANGING A REFERENCE ACCELERATION VALUE

BACKGROUND OF THE INVENTION

1. Field of the Invention

The present invention relates to an apparatus for controlling an automatic transmission of a motor vehicle.

2. Discussion of the Related Art

For controlling an automatic transmission of a motor vehicle having a plurality of operating gear positions, the motor vehicle is provided with a shift control apparatus for selecting one of the operating positions of the automatic transmission to shift the automatic transmission to the selected operating position, on the basis of a detected actual running condition of the vehicle and according to stored predetermined shift patterns. The running condition of the vehicle is defined by an opening angle of a throttle valve and a running condition of the vehicle, for example. The shift patterns consist of shift boundary lines each representing a relationship between the detected actual vehicle running condition and the operating position of the automatic transmission which should be established. The shift control apparatus is adapted to establish the selected operating position of the automatic transmission. Generally, each shift boundary line is prepared or formulated, assuming that the vehicle is run on a flat road surface. Therefore, the shift boundary lines do not necessarily permit adequate selection of the operating gear position of the automatic transmission during running of the vehicle on a downhill or uphill road, since the running load of the vehicle during running of the downhill or uphill road differs from that during running of the vehicle on the flat road.

In view of the above drawback, there have been proposed techniques for determining that the vehicle is running on a downhill or uphill road, and controlling the automatic transmission depending upon the determination. For example, the determination of the downhill or uphill road running is effected by comparing an actual acceleration value of the vehicle with a predetermined reference acceleration value, which is determined on the basis of the vehicle running speed and the throttle opening angle on a flat road. The actual acceleration value is obtained on the basis of the actually detected vehicle speed and throttle opening angle. If the actual acceleration value is higher than the reference value by more than a given amount, it is determined that the vehicle is running on a downhill road. If the actual acceleration value is lower than the reference value by more than a given amount, it is determined that the vehicle is running on an uphill road. In these cases, the shift control apparatus controls the automatic transmission according to downhill running shift patterns or uphill running shift patterns, or preferentially places the automatic transmission in the gear position next to the highest-gear position.

Some motor vehicles are equipped with some auxiliary or optional devices such as a compressor of an air conditioner. When the output of the engine of the vehicle is consumed by such a compressor or other optional device, the determination of the uphill or downhill running of the vehicle cannot be necessarily effected with high accuracy.

Other techniques have been proposed. For instance, JP-A-5-14924 discloses a technique for comparing an actual running resistance of the vehicle with a reference value, and determining uphill running of the vehicle if the actual running resistance is larger than the reference value. Where the uphill running is determined, the automatic transmission is shifted so as to establish the speed ratio suitable for the uphill running of the vehicle. According to the technique disclosed in the document identified above, the running resistance value of the vehicle is reduced according to at least one of the engine speed and vehicle running speed, in relation to the operating state of a device whose operation influences the output torque of the engine or the input torque of the automatic transmission.

If such known shift control apparatus as described above is used to determine downhill running of the vehicle, the operation of the auxiliary device such as the compressor of an air conditioner will cause the running resistance value of the vehicle to decrease with an increase in the engine speed or vehicle running speed, whereby the compensated running resistance value tends to be excessively small when the vehicle speed is relatively high. Accordingly, the actual vehicle acceleration value estimated when the vehicle speed is relatively high tends to be excessively large, leading to a possibility of determination of downhill running of the vehicle even when the downhill road gradient is not so large. Therefore, the known shift control apparatus operated according to the thus estimated vehicle acceleration value may suffer from inadequate control of the speed ratio of the automatic transmission.

SUMMARY OF THE INVENTION

It is therefore an object of the present invention to provide a shift control apparatus for an automatic transmission of a motor vehicle, which permits accurate determination of downhill running of the vehicle and accurate control of the speed ratio of the automatic transmission.

The above object may be achieved according to the principle of the present invention, which provides a shift control apparatus for controlling a speed ratio of an automatic transmission of a motor vehicle having an engine and an accelerator pedal, during running of the vehicle on a downhill road, on the basis of an actual acceleration value of the vehicle as compared with a reference acceleration value of the vehicle, the shift control apparatus comprising: (a) engine output reduction determining means for determining reduction of an actual output of the engine with respect to a desired output of the engine as represented by an operating amount of the accelerator pedal; and (b) reference acceleration reducing means for reducing the reference acceleration value by a compensating amount which decreases with an increase in a running speed of the vehicle, if the engine output reduction determining means has determined the reduction of the actual output of the engine.

In the shift control apparatus of the present invention constructed as described above, the reference acceleration reducing means reduces the reference acceleration value of the vehicle when the engine output reduction determining has determined that the actual output of the engine is reduced. The compensating amount by which the reference acceleration value is reduced decreases with an increase in the running speed of the motor vehicle. The reference acceleration value is reduced from a normal value used during running of the vehicle without the engine output reduction, to a compensated value used during running of the vehicle with the engine output reduction. The actual output of the engine is reduced by operation of fuel cut control means to cut a fuel supply to the engine, or by operation of an auxiliary or optional device such as a compressor of an air conditioner. In this respect, it is noted that the engine output. However, the influence of the fuel cut or the operation of such an auxiliary device on the amount of reduction of the engine output decreases with an increase in the vehicle speed. Accordingly, the compensating amount α by which the reference acceleration value is reduced upon determination of the engine output reduction is determined so as to decrease with the increase in the vehicle speed, so that the influence of the engine output reduction on the determination of the downhill running of the vehicle is eliminated to assure accurate determination of the downhill running of the vehicle, for thereby permitting adequate control of the speed ratio of the automatic transmission.

In a first preferred form of this invention, the shift control apparatus further comprises: (c) downhill determination acceleration determining means for determining a downhill determination acceleration value on the basis of the reference acceleration value of the vehicle determined by the reference acceleration reducing means; (d) downhill running determining means for determining that the vehicle is running on said downhill road, if the actual acceleration value of the vehicle is larger than said downhill determination acceleration value determined by said downhill determination acceleration determining means; and (e) downhill running control means for controlling the speed ratio of the automatic transmission, so as to increase an effect of an engine brake application to the vehicle, if the downhill running determining means has determined that the vehicle is running on the downhill road.

In the first preferred form of the invention described above, the downhill running determining means determines downhill running of the vehicle when the actual acceleration value of the vehicle is larger than the downhill determination acceleration value which is determined on the basis of the reference acceleration value determined by the reference acceleration reducing means. Upon determination of the downhill running of the vehicle, the downhill running control means shifts the automatic transmission to an operating position for increasing the engine braking effect produced by a fuel cut of the engine, for example, which fuel cut results in the reduction of the engine output. Therefore, the influence of the fuel cut on the determination of the downhill running of the vehicle is avoided to assure accurate determination of the downhill running of the vehicle, for thereby permitting the application of an adequate engine brake to the vehicle during the downhill running of the vehicle with the fuel cut.

In a second preferred form of the invention, the reference acceleration reducing means obtains a compensated reference acceleration value by reducing the reference acceleration value by the compensating amount, and the shift control apparatus further comprising: (c) downhill gradient determining means for determining a downhill gradient value on the basis of the running speed of the vehicle and according to a predetermined relationship between the running speed of the vehicle and the downhill gradient value, if the engine output reduction determining means has determined the reduction of the actual output of the engine; (d) first downhill determination acceleration determining means for determining a downhill determination acceleration value on the basis of the compensated reference acceleration value obtained by the reference acceleration reducing means and the downhill gradient value determined by the downhill gradient determining means; and (e) first downhill running determining means for determining that the vehicle is running on the downhill road, if the actual acceleration value of the vehicle is larger than the downhill determination acceleration value determined by the first downhill determination acceleration determining means.

In one advantageous arrangement of the above second preferred form of the invention, the downhill gradient determining means determines a normal downhill gradient value used when the reduction of the actual output of the engine is not determined by the engine output reduction determining means, and determines a compensated downhill gradient value when the reduction of the actual output of the engine is determined by the engine output reduction determining means. This compensated downhill gradient value is larger than the normal downhill gradient value by a compensating amount which decreases with an increase in the running speed of the vehicle. In this arrangement, the downhill determination acceleration value used upon engine output reduction (due to the fuel cut of the engine, for example) during running of the vehicle at a given running speed is the same as that used during running of the vehicle at the same running speed without the engine output reduction, whereby the accuracy of determination of the downhill running of the vehicle is not deteriorated even in the event of the engine output reduction.

In the above advantageous arrangement, the shift control apparatus may further comprise: second downhill determination acceleration determining means for determining a downhill determination acceleration value on the basis of the compensated reference acceleration value obtained by the reference acceleration reducing means and the normal downhill gradient value determined by the downhill gradient determining means; and second downhill running determining means for determining that the vehicle is running on the downhill road, if the actual acceleration value of the vehicle is larger than the downhill determination acceleration value determined by the second downhill determination acceleration determining means. The downhill determination acceleration value used by the second downhill running determining means is smaller than the downhill determination acceleration value used by the first downhill running determining means. However, the normal downhill gradient value used during running of the vehicle at a given speed with the engine output reduction is the same as used during running of the vehicle at the same speed without the engine output reduction. This arrangement is effective to avoid unexpected downhill running control at different gradient values of a downhill road.

In the above case, the shift control apparatus may further comprise selecting means for determining whether the running speed of the vehicle is higher a predetermined threshold, the selecting means selecting the first downhill running determining means for enabling the first downhill running determining means if the running speed is higher than the threshold, and selecting the second downhill running determining means for enabling the second downhill running determining means if the running speed is not higher than the threshold. That is, the first downhill running determining means is used when the vehicle speed is relatively high, because the fuel cut of the engine or an operation of an air conditioner causes a relatively small amount of reduction of the engine output when the vehicle speed is relatively high. Conversely, the second downhill running determining means is used when the vehicle speed is relatively low, because the fuel cut or the operation of the air conditioner causes a relatively large amount of reduction of the engine output when the vehicle speed is relatively low.

BRIEF DESCRIPTION OF THE DRAWINGS

The above and optional objects, features, advantages and industrial and technical significance of this invention will be better understood by reading the following detailed description of presently preferred embodiments of the invention, when considered in connection with the accompanying drawings, in which:

FIG. 2 is a table indicating a relationship between the operating positions of the automatic transmission and respective combinations of clutches and brakes which are controlled by first and second solenoid-operated valves;

DETAILED DESCRIPTION OF THE PREFERRED EMBODIMENTS

Figure 1:
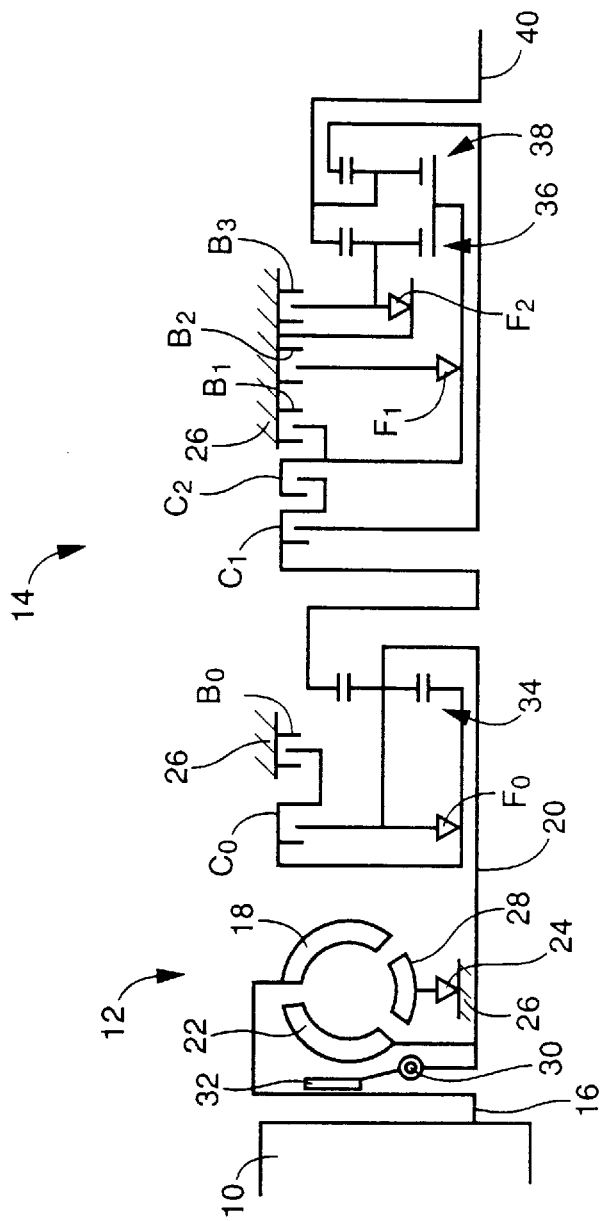
FIG. 1 is a schematic view of a part of a power transmitting system of a motor vehicle, which incorporates an automatic transmission controlled by a shift control apparatus constructed according to one embodiment of this invention.

Referring first to the schematic view of FIG. 1, there is shown a part of a power transmitting system of a motor vehicle, wherein power generated by an engine 10 is transmitted to a differential gear device and drive wheels of the vehicle through a torque converter 12 and an automatic transmission 14. The torque converter 12 is equipped with a lock-up clutch 32. The automatic transmission 14 includes three planetary gear sets to selectively establish a plurality of operating gear positions having respective speed ratios.

The torque converter 12 includes: a pump impeller 18 connected to a crankshaft 16 of the engine 10; a turbine impeller 22 fixed to an input shaft 20 of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through a damper 30.

The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The damper 30 is disposed on a hub of the turbine impeller 22 such that the damper 30 is axially movable relative to and rotatable with the turbine impeller 22.

The automatic transmission 14 includes: the input shaft 20; a first, a second and a third planetary gear set 34, 36, 38; and an output shaft 40 rotated with a carrier of the planetary gear set 38. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 84 shown in FIG. 3 (which will be described), so as to selectively establish the operating positions of the automatic transmission 14. That is, the automatic transmission 14 has four forward drive positions, namely, first-speed position "1", second-speed position "2", third-speed position "3" and fourth-speed position "4", and one rearward drive position "R", as indicated in the table of FIG. 2. The four forward drive positions "1", "2", "3" and "4" have respective different speed ratios I which decrease in the order of description. The speed ratio I is defined as the speed of the input shaft 20 divided by the speed of the output shaft 40.

It is noted that the lower halves of the torque converter 12 and automatic transmission 14 are not shown in FIG. 1 in the interest of simplification, since each of these devices 12, 14 is symmetrical with respect to its axis of rotation.

Referring next to the block diagram of FIG. 3, there will be described a control system provided to control the engine 10, lock-up clutch 32 and automatic transmission 14 of the motor vehicle. The control system includes the electronic transmission controller 84 indicated above, which is adapted to control a hydraulic control device 44. This hydraulic control circuit 44 includes a transmission control circuit for shifting the automatic transmission 14 to an appropriate one of the operating positions, and a lock-up clutch control circuit for controlling the operating state (fully or partially engaged or released state) of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions of the automatic transmission 14, when a shift control valve is operated to respective operating positions which are selected or established depending upon respective combinations of the operating states of the first and second solenoid-operated valves S1, S2, as indicated in FIG. 2.

The lock-up clutch control circuit of the hydraulic control device 44 includes a third solenoid-operated valve S3, a lock-up relay valve, a linear solenoid valve SLU, and a lock-up clutch control valve. The third solenoid-operated valve S3 has a solenoid coil which is turned on and off. When the coil is on, the valve S3 generates a LOCK-UP SWITCHING pilot pressure. The lock-up relay valve has a releasing state and an engaging state for releasing and engaging the lock-up clutch 32, respectively, depending upon whether the pilot pressure is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 84. The lock-up clutch control valve is adapted to regulate an amount of slip of the lock-up clutch 32.

Figure 3:
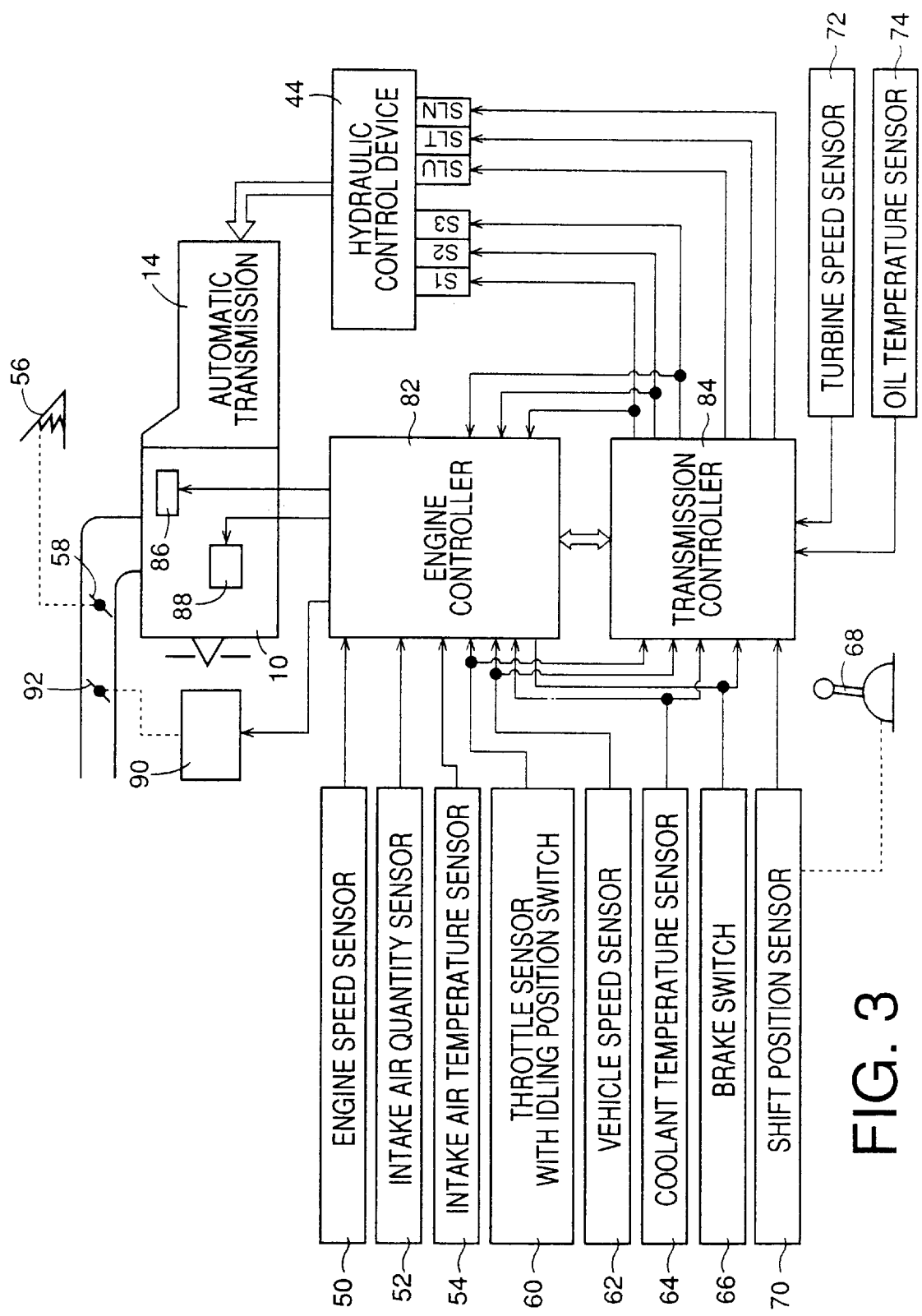
FIG. 3 is a block diagram illustrating a control system for the motor vehicle.

As shown in FIG. 3, the motor vehicle has various sensors and switches including: an engine speed sensor 50 for detecting a speed $N_E$ of the engine 10, namely, speed $N_P$ of the pump impeller 18 (which may be equal to speed $N_{IN}$ of the input shaft 20 of the automatic transmission 14); an intake air quantity sensor 52 for detecting a quantity Q of intake air sucked into the engine 10 through an intake pipe; an intake air temperature sensor 54 for detecting a temperature $T_{AIR}$ of the intake air; a throttle sensor 60 for detecting an angle of opening TA of a first throttle valve 58 operated by an accelerator pedal 56; a vehicle speed sensor 62 for detecting a running speed V of the vehicle on the basis of a speed $N_{OUT}$ of the output shaft 40 of the automatic transmission 14; a coolant temperature sensor 64 for detecting a temperature $T_{WA}$ of a coolant water of the engine 10; a brake switch 66 for detecting an operation of a brake pedal; a shift position sensor 70 for detecting a currently selected operating position Ps of a shift lever 68, namely, a currently selected one of the operating positions "L", "S", "D", "N", "R" and "P" of the shift lever 68; a turbine speed sensor 72 for detecting a speed $N_T$ of the turbine impeller 22, namely, the speed $N_{IN}$ of the input shaft 20 of the automatic transmission 14; and an oil temperature sensor 74 for detecting a temperature $T_{OIL}$ of the working oil in the hydraulic control device 44. The throttle sensor 60 is equipped with an engine idling position switch for detecting the idling position of the first throttle valve 58 which corresponds to the idling position of the engine 10.

The output signals generated by the above sensors and switch are applied directly or indirectly to an electronic engine controller 82 and the electronic transmission controller 84. The two controllers 82, 84 are connected to each other by a communication interface, for applying the necessary signals to each other.

The transmission controller 84 is comprised of a so-called microcomputer incorporating a central processing unit (CPU), a read-only memory (ROM), a random-access memory (RAM), and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently established position of the transmission 14 is selected to determine or selected the operating position (one of the four forward drive positions) to which the transmission 14 should be shifted down or up. For instance, each shift pattern consists of a shift-down boundary line and a shift-up boundary line which are relationships between the throttle valve opening TA and the vehicle speed V. On the basis of the determined forward drive position to which the transmission 14 should be shifted, the solenoid-operated valves S1 and S2 are suitably controlled (with their solenoid coils being suitably energized or deenergized), so as to establish an appropriate combination of the operating states of the clutches and brakes C0, C1, C2, B0, B1, B2, B3, which combination corresponds to the selected forward drive position.

The transmission controller 84 is further adapted to determine that the vehicle is running on a downhill road. Upon determination of downhill running, the transmission controller 84 selects an appropriate one of downhill running shift patterns to shift the automatic transmission 14, or inhibits the automatic transmission 14 from being placed in the highest-gear position, namely, the fourth-speed position "4". In the latter case, the automatic transmission 14 is brought to the next highest-gear position, namely, the third-speed position "3" even when the fourth-speed position "4" is selected according to the normal shift pattern. In the present embodiment, the transmission controller 84 is adapted to inhibit the automatic transmission 14 from being placed in the fourth-speed position "4" upon determination of the downhill running, as described below.

The electronic engine controller 82 is comprised of a microcomputer similar to that of the transmission controller 84, which has a CPU adapted to process the input signals according to control programs stored in a ROM while utilizing a temporary data storage function of a RAM, for controlling the engine 10, more specifically, for effecting a fuel injection control for controlling a fuel injector valve 86 so as to optimize the combustion condition of the engine 10, an ignition control for controlling an ignitor 88 so as to optimize the ignition timing, a traction control for controlling a second throttle valve 92 via a throttle actuator 90 so as to control the traction force of the vehicle while preventing slipping of the drive wheels on the road surface upon starting or acceleration of the vehicle, and a fuel-cut control for holding the fuel injector valve 86 closed while the engine speed $N_E$ is higher than a predetermined fuel-cut threshold level $N_{CUT}$ during coasting of the vehicle, so that the fuel economy of the vehicle is improved.

Referring next to the functional block diagram of FIG. 4, there will be described the functions of various functional means provided in the electronic engine controller 82 and electronic transmission controller 84. The engine controller 82 incorporates fuel cut control means 107, while the transmission controller 84 incorporates shift control means 100, downhill running determining means 102, downhill running control means 104, engine output reduction determining means 106, reference acceleration reducing means 108, downhill gradient determining means 110 and first downhill determination acceleration determining means 112.

The shift control means 100 is adapted to determine whether the automatic transmission 14 should be shifted down or up from the currently established position to another position. This determination and the selection of the position to which the automatic transmission 14 should be shifted are effected on the basis of the detected throttle opening angle TA and vehicle running speed V, and according to one of the shift patterns stored in the ROM, which corresponds to the currently established position of the automatic transmission 14. The shift control means 100 controls the first and second solenoid-operated valves S1, S2 so as to shift the automatic transmission 14 to the thus selected operating position.

The downhill running determining means 102 is adapted to determine whether the vehicle is running on a downhill road. This determination is effected by determining whether an actual acceleration value MOBG of the vehicle is higher than a downhill determination acceleration value (SBG43+ KGBD) which is obtained based on a reference acceleration value SBG43 which is a standard acceleration value during running of the vehicle on a flat road surface. Data representative of the reference acceleration value SBG43 in relation to the throttle opening angle TA are stored in the ROM. The downhill running determining means 102 determines downhill running of the vehicle when the actual acceleration value MOBG is larger than the downhill determination acceleration value (SBG43+KGBD). The actual acceleration value MOBG may be obtained on the basis of a change in the pulse width of the output signal of the vehicle speed sensor 62, for example.

The downhill running control means 104 is adapted to shift down the automatic transmission 14 to the third-speed position "3", upon determination of the downhill running of the vehicle by the downhill running determining means 102, if the automatic transmission 14 is currently placed in the fourth-speed position "4", and if the accelerator pedal 56 has been returned to the non-operated position, that is, if the throttle opening angle TA is zero or the idling position switch of the throttle sensor 60 is on. Thus, the downhill running control means 104 is adapted to override the selection of the operating position of the automatic transmission 14 by the shift control means 100.

The engine output reduction determining means 106 is adapted to determine whether the actual output of the engine 10 has been reduced as a result of an operation of a device which causes the output of the engine 10 to be smaller than a desired output corresponding to the operating amount of the accelerator pedal 56. Such a device may be the fuel cut control means 107 of the engine controller 82 adapted to effect the fuel cut control described above, an air conditioner, or an exhaust retarder.

Figure 7:
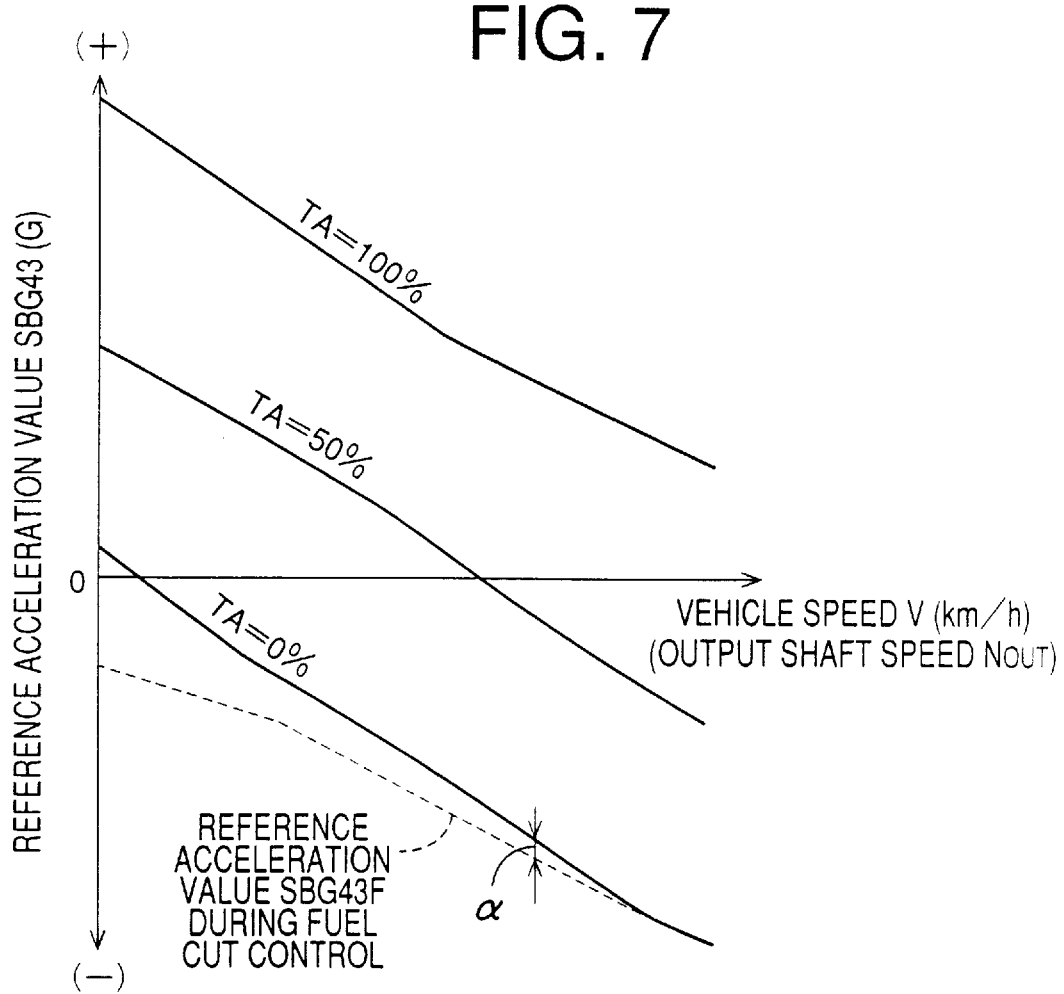
FIG. 7 is a view for explaining a stored predetermined relationship used for obtaining a reference acceleration value of the vehicle in the sub-routine of FIG. 6.

The reference acceleration reducing means 108 is adapted to determine the reference acceleration value SBG43 in a normal manner according to a predetermined normal relationship between the reference acceleration value SBG43 and the vehicle speed V, as indicated by solid lines in FIG. 7, by way of example, when the engine output reduction determining means 106 determines that the engine output has not been reduced. The reference acceleration reducing means 108 is further adapted to obtain a compensated value SBG43F of the reference acceleration value SBG43, according to a predetermined compensating relationship between the compensated value SBG43F and the vehicle speed V, as indicated by broken line in FIG. 7, by way of example, when the engine output reduction determining means 106 determines that the engine output has been reduced. The compensated reference acceleration value SBG43F is smaller than the normal reference acceleration value SBG43 by a compensating amount α which decreases with an increase in the vehicle speed V, except when the vehicle speed V is relatively low.

Figure 8:
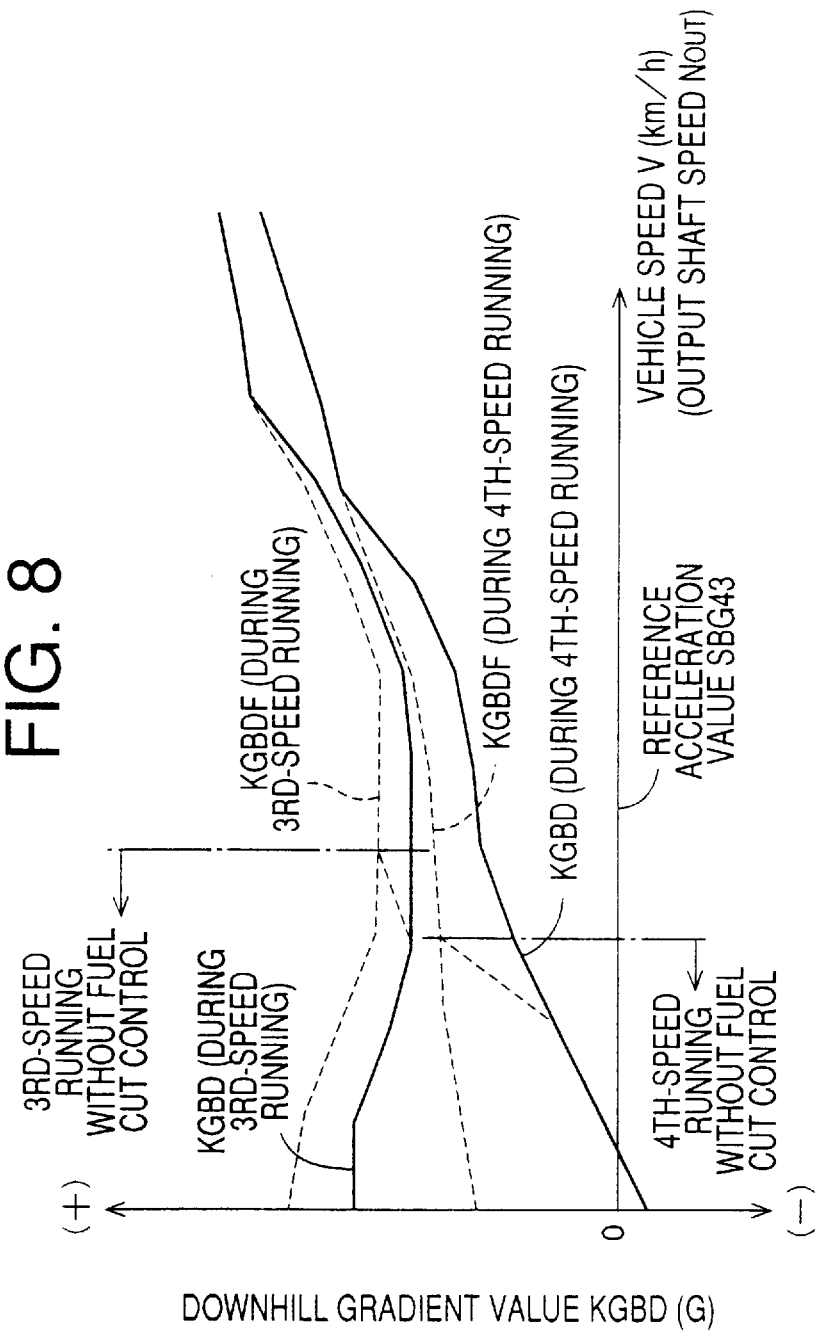
FIG. 8 is a view for explaining a stored predetermined relationship used for obtaining a downhill gradient value in the sub-routine of FIG. 6.

The downhill gradient determining means 110 is adapted to determine a downhill gradient value KGBD in a normal manner according to a predetermined normal relationship between the downhill gradient value KGBD and the vehicle speed V, as indicated by solid lines in FIG. 8, by way of example, when the engine output reduction determining means 106 does not determine reduction of the engine output. The downhill gradient determining means 110 is further adapted to obtain a compensated value KGBDF of the downhill gradient value KGBD, according to a predetermined compensating relationship between the compensated value KGBD and the vehicle speed V, as indicated by broken line in FIG. 8, by way of example, when the engine output reduction determining means 106 determines reduction of the engine output.

The compensated downhill gradient value KGBDF is larger than the normal downhill gradient value KGBD by an amount α which decreases with an increase in the vehicle speed V. Namely, KGBDF=KGBD+α. It is noted that FIG. 8 shows the downhill gradient value KGBD and the compensated value KGBDF when the compensated reference acceleration value SBG43F is zero. The compensated downhill gradient value KGBDF is not determined when the fuel cut control is not effected while the vehicle speed V is relatively low.

The first downhill determination acceleration determining means 112 is adapted to determine first downhill determination acceleration value (SBG43F+KGBDF), on the basis of the compensated reference acceleration value SBG43F and the compensated downhill gradient value KGBDF, which have been determined by the reference acceleration reducing means 108 and the downhill gradient determining means 110, respectively. The downhill running determining means 102 includes first downhill running determining means 116 for determining downhill running of the vehicle if the actual acceleration value MOBG of the vehicle is larger than the downhill determination acceleration value (SBG43F+KGBDF) determined by the first downhill determination acceleration determining means 112.

Figure 5:
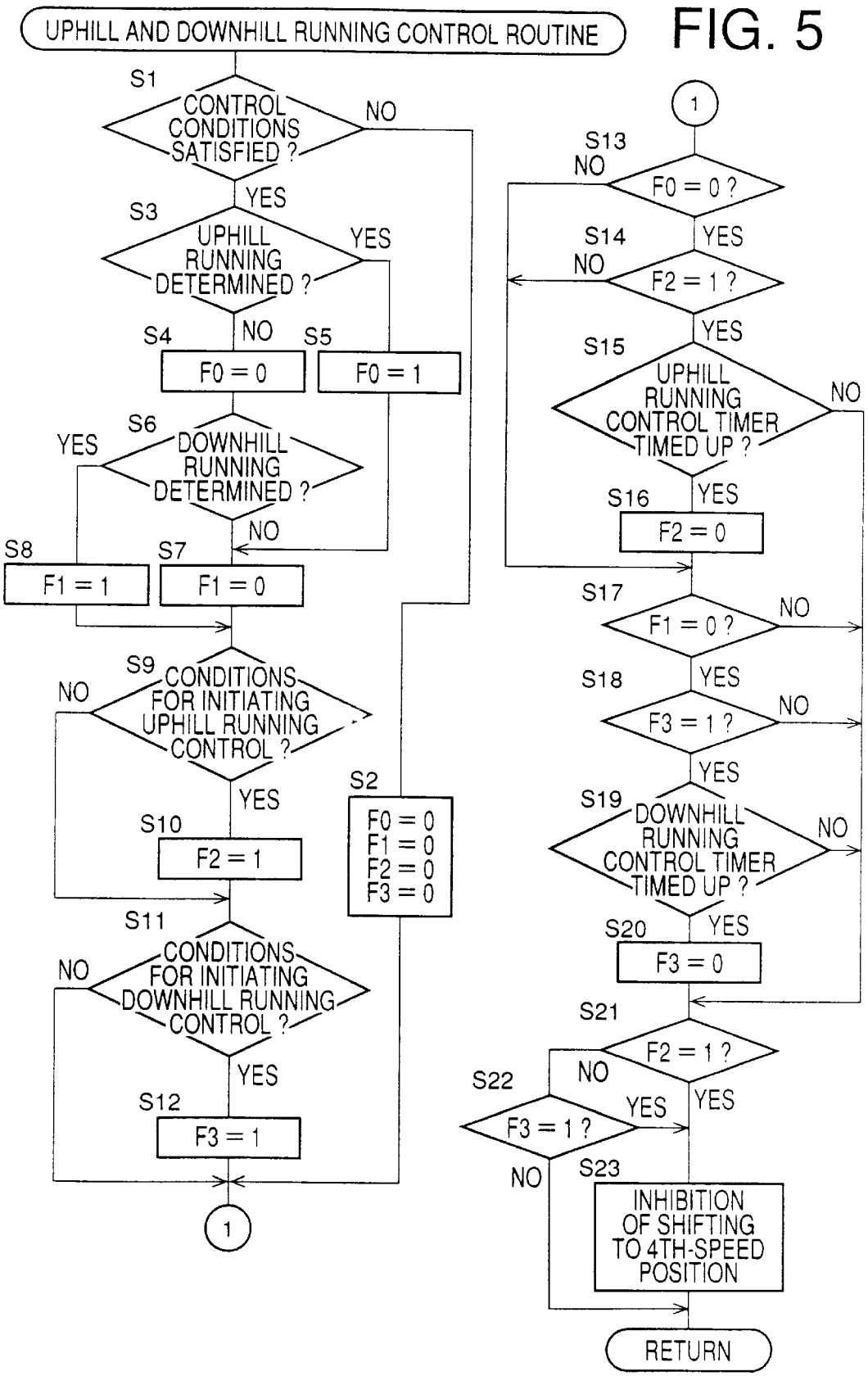
FIG. 5 is a flow chart illustrating a uphill and downhill running control routine executed by the transmission controller of FIG. 3.
Figure 6:
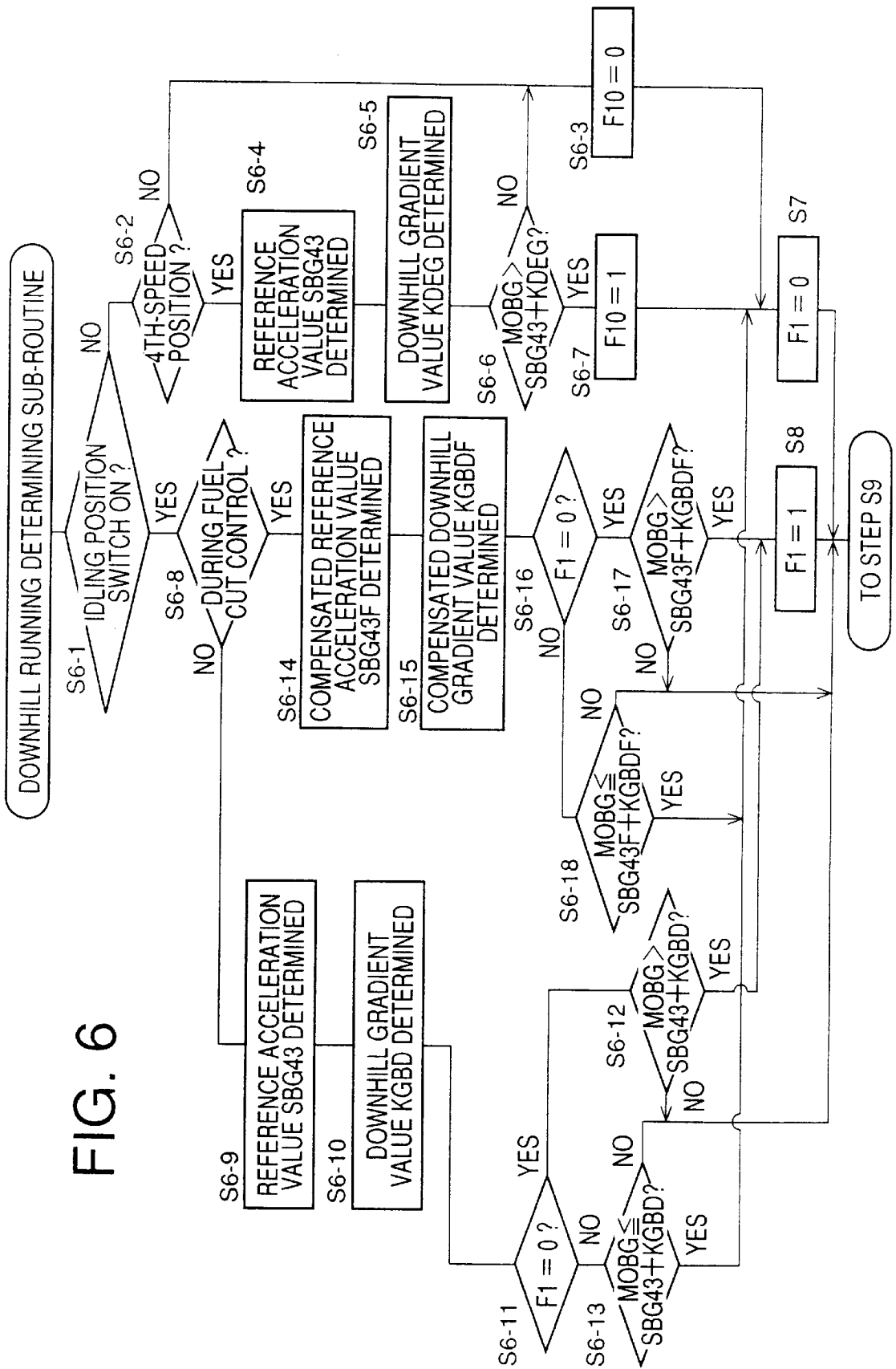
FIG. 6 is a flow chart illustrating a downhill road determining sub-routine executed in step S6 of the routine of FIG. 5.

Referring to the flow charts of FIGS. 5 and 6, there will be described an uphill and downhill running control routine executed by the transmission controller 84 incorporating the functional means 100, 102, 104, 106, 108, 110, 112 which have been described above. The uphill and downhill running control routine of FIG. 5 is formulated to inhibit the automatic transmission 14 from being placed in the fourth-speed position "4", so as to improve an engine braking effect, upon determination that the vehicle is running on a downhill road. The flow chart of FIG. 6 illustrates a sub-routine executed in step S6 of the routine of FIG. 5, for determining downhill running of the vehicle. The functions of the functional means 102, 104, 106, 108, 110 and 112 will become more apparent from the following description of the uphill and downhill running control routine. Since a routine corresponding to the shift control means 100 per se is well known in the art, no further description is deemed necessary.

The routine of FIG. 5 is initiated with step S1 to determine whether predetermined conditions for initiating the present uphill and downhill running control routine has been satisfied. These conditions include, for example: (a) a condition that the vehicle speed sensor 62 is normally functioning; (b) a condition that the operating position of the shift lever 68 detected by the shift position sensor 70 is the drive position "D"; (c) a condition that the vehicle is running with the automatic transmission 14 placed in the third-speed or fourth-speed position "3" or "4"; (d) a condition that the vehicle running speed V is held within a predetermined range of 15–125 km/h, for example; (e) a condition that an OVERDRIVE OFF switch is off, permitting the automatic transmission 14 to be placed in the fourth-speed position, if necessary; and (f) a condition that an automatic cruise control is not effected with the an AUTO CRUISE switch being off.

If a negative decision (NO) is obtained in step S1, the control flow goes to step S2 to reset various flags to "0". These flags include an UPHILL DETERMINATION flag F0, a DOWNHILL DETERMINATION flag F1, an UPHILL HIGH-SPEED POSITION INHIBIT flag F2, and a DOWNHILL HIGH-SPEED POSITION INHABIT flag F3. Step S2 is followed by step S13 which will be described. The UPHILL DETERMINATION flag F0, when it is set at "1", indicates that uphill running of the vehicle has been determined. The DOWNHILL DETERMINATION flag F1, when it is set at "1", indicates that downhill running of the vehicle has been determined. The UPHILL HIGH-SPEED POSITION INHIBIT flag F2, when it is set at "1", indicates that the automatic transmission 14 is prevented from being placed in the fourth-speed position during the uphill running of the vehicle. The DOWNHILL HIGH-SPEED POSITION INHIBIT flag F3, when it is set at "1", indicates that the automatic transmission 14 is prevented from being placed in the fourth-speed position during the downhill running of the vehicle.

If an affirmative decision (YES) is obtained in step S1, the control flow goes to step S3 to determine whether uphill running of the vehicle has been determined. For stable determination of the uphill running of the vehicle, there is provided a hysteresis between the determination of the uphill running following the non-uphill running and the determination of the non-uphill running following the uphill running. Described in detail, the uphill running following the non-uphill running is determined if a relationship represented by MOBG≦SBG43−KDGSF is satisfied for more than a predetermined time. Further, the non-uphill running following the uphill running is determined if a relationship represented by MOBG>SBG43−KDGSN is satisfied for more than a predetermined time. As described above, "MOBG" represents a rate of change in the vehicle running speed V detected by the vehicle speed sensor 62, that is, the detected actual acceleration value of the vehicle, and "SBG43" represents the reference acceleration value of the vehicle during running thereof on a flat road surface. The reference acceleration value SBG43 is determined on the basis of the detected throttle opening angle TA and vehicle speed V, and according to one of two predetermined relationships between the throttle opening angle TA and vehicle speed V and the reference acceleration value SBG43, as indicated by the solid lines in FIG. 7. The two relationships correspond to the third-speed and fourth-speed positions "3", "4" of the automatic transmission 14, and the relationship corresponding to the currently established position "3" or "4" is selected to determine the reference acceleration value SBG43. The data representative of these relationships are stored in the ROM of the transmission controller 84. Further, "KDGSF" represents a positive value of a positive hysteresis which is obtained from a predetermined relationship between this hysteresis value KDGSF and the vehicle speed V. This relationship, which is also stored in the ROM, is formulated so that the hysteresis value KDGSF is constant while the vehicle speed V is smaller than a predetermined threshold, and is higher than the constant value when the vehicle speed V is higher than the threshold. "KDGSN" represents a positive value of a negative hysteresis which is obtained from one of predetermined relationships between this hysteresis value KDGSN and the vehicle speed V. These relationships, which are also stored in the ROM, correspond to respective different drive modes of the vehicle selected by a DRIVE MODE selector switch, and are formulated so that the hysteresis value KDGSN is larger when the vehicle speed V is relatively high than when it is relatively low.

If a negative decision (NO) is obtained in step S3, the control flow goes to step S4 to reset the UPHILL DETERMINATION flag F0 to "0", and then goes to step S6 for determining whether downhill running of the vehicle has been determined. If an affirmative decision (YES) is obtained in step S3, the control flow goes to step S5 to set the UPHILL DETERMINATION flag F0 to "1". In this case, the control flow then goes to step S7, skipping step S6, since the determination in step S6 is not necessary when the affirmative decision (YES) is obtained in step S3. If a negative decision (NO) is obtained in step S6, the control flow goes to step S7. In this step S7, the DOWNHILL DETERMINATION flag F1 is reset to "0". If an affirmative decision (YES) is obtained in step S6, the control flow goes to step S8 to set the DOWNHILL DETERMINATION flag F1 to "1". An operation performed in steps S6–S8 will be described in detail by reference to the flow chart of FIG. 6 illustrating the downhill running determining sub-routine. The downhill running determining means 102 shown in FIG. 4 corresponds to steps S6–S8 of the sub-routine of FIG. 6.

The downhill running determining sub-routine of FIG. 6 is initiated with step S6-1 to determine whether the idling position switch of the throttle sensor 60 is on, that is, whether the throttle opening angle TA of the throttle valve 58 is zero. This determination is effected on the basis of the output signal of the throttle sensor 60. While the vehicle is running with the accelerator pedal being depressed, a negative decision (NO) is obtained in step S6-1, and the control flow goes to step S6-2 to determine whether the automatic transmission 14 is placed in the fourth-speed position "4". If a negative decision (NO) is obtained in step S6-2, the control flow goes to step S6-3 in which a second UPHILL DETERMINATION flag F10 is reset to "0". Step S6-3 is followed by step S7 in which the UPHILL DETERMINATION flag F1 is reset to "0", as described above with respect to the routine of FIG. 5. If an affirmative decision (YES) is obtained in step S6-2, the control flow goes to step S6-4 and the following steps for determining whether the vehicle is running on a downhill road.

In step S6-4, the reference acceleration value SBG43 is determined on the basis of the throttle valve opening TA and vehicle speed V, according to the relationship corresponding to the fourth-speed position "4", as indicated by the solid lines in FIG. 7. Step S6-4 is followed by step S6-5 to determine a downhill gradient value KDEG on the basis of the detected vehicle speed V and according to a predetermined relationship between the speed V and the value KDEG. This relationship is used when the throttle valve 58 is not placed in the engine idling position. The downhill gradient value KDEG is a value to be added to the reference acceleration value SBG43, to obtain a sum (SBG43+KDEG) for determining whether the vehicle is running on a downhill road. Since the downhill gradient value KDEG varies with the vehicle speed V, the value KDEG is influenced by the actual gradient of the road surface.

Then, the control flow goes to step S6-6 to determine whether the actual acceleration value MOBG of the vehicle is higher than the sum (SBG43+KDEG) of the reference acceleration value SBG43 and the downhill gradient value KDEG. If a negative decision (NO) is obtained in step S6-6, it means that the vehicle is not running on a downhill road. In this case, the control flow goes to step S6-3. If an affirmative decision (YES) is obtained in step S6-6, the control flow goes to step S6-7 to reset the second DOWNHILL DETERMINATION flag F10 to "1". Step S6-7 is followed by step S7 described above.

When the vehicle is coasting with the idling position switch of the throttle sensor 60 being on, an affirmative decision (YES) is obtained in step S6-01,. In this case, the control flow goes to step S6-8 corresponding to the engine output reduction determining means 106, to determine whether the fuel cut control of the engine 10 is being effected under the control of the fuel cut control means 107. If a negative decision (NO) is obtained in step S6-8, the control flow goes to step S6-9 in which the reference acceleration value SBG43 of the vehicle is determined on the basis of the detected throttle opening angle TA (0%) and the vehicle speed V, and according to the predetermined relationship of FIG. 7 corresponding to the currently established third-speed or fourth-speed position "3", "4" of the automatic transmission 14, as described above. Step S6-9 is followed by step S6-10 in which the downhill gradient value KGBD is determined on the basis of the detected vehicle speed V and the currently established operating position of the automatic transmission 14, and according to the predetermined relationship of FIG. 8 between the value KGBD and the vehicle speed V when the vehicle is coasting with the throttle valve 58 placed in the engine idling position, as described above. The downhill gradient value KGBD is added to the reference acceleration value SBG43 to obtain the sum (SBG43+KGBD), which is used as the downhill determination acceleration value for determining whether the vehicle is running on a downhill road. The downhill gradient value KGBD varies with the vehicle speed V. In other words, the downhill gradient value KGBD represents or reflects the actual gradient of the road surface, which can be used to determine whether the vehicle is running on a downhill road or not.

Step S6-10 is followed by step S6-11 to determine whether the DOWNHILL DETERMINATION flag F1 is set at "1". If an affirmative decision (YES) is obtained in step S6-11, the control flow goes to step S6-12 to determine whether the actual acceleration value MOBG of the vehicle is larger than the downhill determination acceleration value (SBG43+KGBD), which is the sum of the reference acceleration value SBG43 and the downhill gradient value KGBD. If a negative decision (NO) is obtained in step S6-12, it means that the vehicle is not running on a downhill road, and the control flow goes to step S9 of the routine of FIG. 5. If an affirmative decision (YES) is obtained in step S6-12, the control flow goes to step S8 to set the DOWNHILL DETERMINATION flag F1 to "1", and then to step S9. If a negative decision (NO) is obtained in step S6-1, it means that the DOWNHILL DETERMINATION flag F1 is set at "1". In this case, the control flow goes to step S6-13 to determine whether the actual acceleration value MOBG is equal to or smaller than the downhill determination acceleration value (SBG43+KGBD). If a negative decision (NO) is obtained in step S6-13, the control flow goes to step S9, and the flag F1 remains to be set at "1". If an affirmative decision (YES) is obtained in step S6-13, it means that the vehicle is not running on a downhill road, and the control flow goes to step S7 to reset the flag F1 to "0".

If an affirmative decision (YES) is obtained in step S6-8, that is, if the fuel cut control of the engine 10 is being effected, the control flow goes to step S6-14 to determine the reference acceleration value SBG43 while the vehicle is running with the automatic transmission 14 being placed in the third-speed or fourth-speed position and with the fuel cut control of the engine 10 being effected. This determination of the reference acceleration value SBG43F is made on the basis of the detected throttle opening angle TA (0%) and vehicle speed V and according to the predetermined relationship between the compensated value SBG43F and the throttle opening angle TA and vehicle speed V, as indicated by the broken line in FIG. 7. The relationship used corresponds to the currently established third-speed or fourth-speed position of the transmission 14. This reference acceleration value SBG43F during the fuel cut control of the engine 10 is smaller than the normal reference acceleration value SBG43, and is a negative value due to an engine brake application to the vehicle during the fuel cut control. Step S6-14 is followed by step S6-14 in which the compensated downhill gradient value KGBDF when the vehicle is running with the fuel cut control of the engine 10 is determined on the basis of the detected vehicle speed V and the currently established operating position of the automatic transmission 14, and according to the predetermined relationship between the compensated value KGBDF and the vehicle speed V when the vehicle is coasting with the throttle valve 58 placed in the engine idling position, as indicated by the broken line in FIG. 8. The relationship used is indicated by the broken lines in FIG. 8. This compensated downhill gradient value KGBDF is added to the compensated reference acceleration value SBG43F to obtain the downhill determination value (SBG43F+KGBDF) for determining whether the vehicle is coasting on a downhill road. The compensated downhill gradient value KGBDF varies with the vehicle speed V. In other words, the compensated downhill gradient value KGBDF represents or reflects the actual gradient of the road surface, which can be used to determine whether the vehicle is coasting on a downhill road or not.

Step S6-14 is followed by step S6-16 to determine whether the DOWNHILL DETERMINATION flag F1 is set at "0". If an affirmative decision (YES) is obtained in step S6-16, the control flow goes to step S6-17 to obtain the sum of the compensated acceleration value SBG43F and the compensated downhill gradient value KGBDF, and determine whether the actual acceleration value MOBG of the vehicle is larger than the sum (SBG43F+KGBDF), which is used as the downhill determination acceleration value during the fuel cut control of the engine 10. Step S6-17 corresponds to the first downhill determination acceleration determining means 112 for determining the first compensated value (SBG43F+KGBDF) of the downhill determination acceleration value (SBG43+KGBD), and also corresponds to the first downhill running determining means 116 for determining downhill running of the vehicle if the actual acceleration value MOBG is larger than the first compensated value (SBG43F+KGBDF).

If a negative decision (NO) is obtained in step S6-17, it means that the vehicle is not coasting on a downhill road, and the control flow goes to step S9. If an affirmative decision (YES) is obtained in step S6-17, it means that the vehicle is coasting on a downhill road. In this case, the control flow goes to step S8 to set the DOWNHILL DETERMINATION flag F1 to "1", and then goes to step S9. If a negative decision (NO) is obtained in step S6-16, it means that the flag F1 is set at "1". In this case, the control flow goes to step S6-18 to determine whether the actual acceleration value MOBG is equal to or smaller than the downhill determination acceleration value (SBG43F+KGBDF). If a negative decision (NO) is obtained in step S6-18, the control flow goes to step S9, whereby the DOWNHILL DETERMINATION flag F1 is held at "1". If an affirmative decision (YES) is obtained in step S6-18, it means that the vehicle is not running on a downhill road. In this case, the control flow goes to step S7 to reset the flag F1 to "0".

Figure 9:
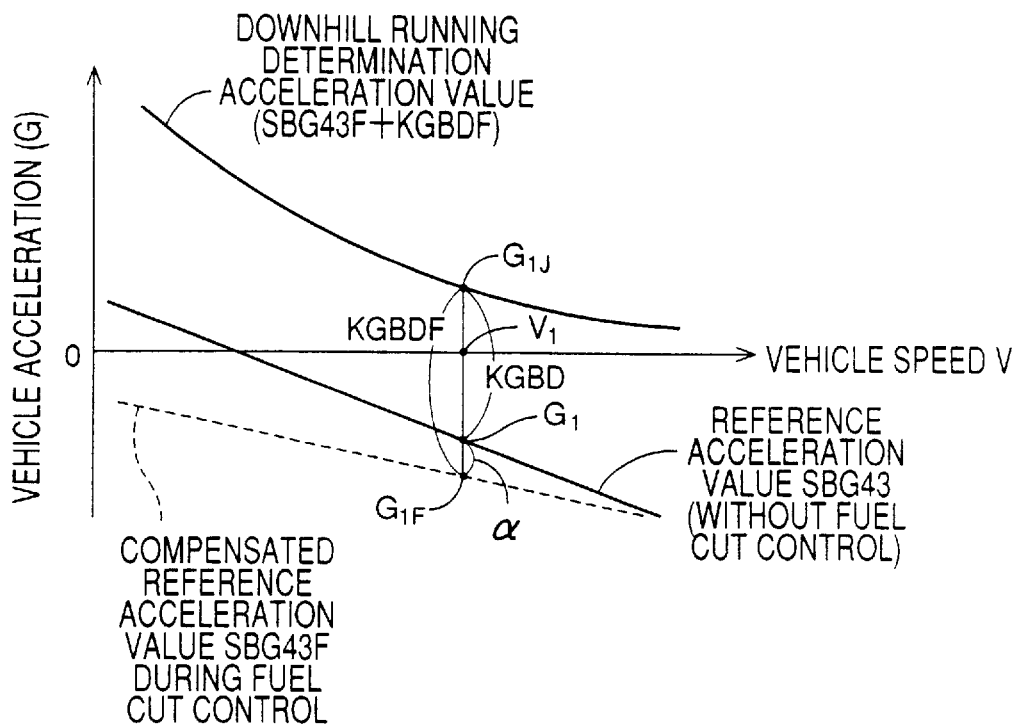
FIG. 9 is a view for explaining a manner of determining a downhill road in the sub-routine of FIG. 6.

In an example shown in FIG. 9 in which the actual vehicle speed V is V1, the DOWNHILL DETERMINATION flag F1 is set to "1" in step S8 if it is determined in step S6-17 that the actual acceleration value MOBG is larger than the downhill determination acceleration value $G_{1J}$=(SBG43F+ KGBDF) corresponding to the vehicle speed V1. The compensated reference acceleration value $G_{1F}$=SBG43F during the fuel cut control at the vehicle speed V1 is smaller than the normal reference acceleration value $G_1$=SBG43 during normal coasting of the vehicle without the fuel cut control, by the compensating amount α which corresponds to the engine braking effect produced by the fuel cut. The compensated reference acceleration value $G_{1F}$ is a negative value. On the other hand, the compensated downhill gradient value KGBDF during the fuel cut control is larger than the normal downhill gradient value KGBD during normal coasting of the vehicle without the fuel cut control, by the compensating amount α corresponding to the engine braking effect by the fuel cut. Therefore, the downhill determination value (SBG43F+KGBDF) used during coasting of the vehicle at a given running speed V with the fuel cut control is the same as the downhill determination value (SBG43+ KGBD) used during coasting of the vehicle at the same running speed V without the fuel cut control.

The compensating amount α for compensating the reference acceleration value SBG43 and the downhill gradient value KGBD to obtain the compensated value reference acceleration value SBG43F and compensated downhill gradient value KGBD is considered to correspond to an amount by which the reference acceleration value SBG43 should be reduced to compensate for the amount of reduction of the output of the engine 10 caused by the fuel cut of the engine 10. The compensating amount α is determined so as to decrease with an increase in the vehicle speed V, in accordance with the specific characteristic of an amount of increase in the engine braking effect by the fuel cut in relation to the vehicle speed V. However, this relationship of the compensating amount α with the vehicle speed V is not provided while the vehicle speed V is lower than a threshold which is slightly higher than a level corresponding to the fuel cut threshold $N_{CUT}$ below which the fuel cut is not available.

If the affirmative decision (YES) is obtained in step S6-17 and the DOWNHILL DETERMINATION flag F1 is set to "1" in step S8, the control flow goes to step S9 of the uphill and downhill running control routine of FIG. 5, to determine whether predetermined conditions for initiating uphill running control of the vehicle. These conditions include, for example: (a) a condition that the brake pedal has not been depressed; (b) a condition that the idling position switch of the throttle sensor 60 is off; (c) a condition that the automatic transmission 14 has been or is being brought to the third-speed position "3" under the control of the shift control means 100; and (d) a condition that the DOWNHILL DETERMINATION flag F0 is set at "1".

If an affirmative decision (YES) is obtained in step S9, the control flow goes to step S10 to set the UPHILL HIGH-SPEED POSITION INHIBIT flag F2 to "1". Step S10 is followed by step S11. If a negative decision (NO) is obtained in step S9, the control flow goes to step S11, while skipping step S10. Step S11 is provided to determine whether predetermined conditions for initiating downhill running control of the vehicle. These conditions include, for example: (a) a condition that the idling position switch is on; (b) a condition that a time lapse t after the idling position switch has been turned on is within a predetermined value $t_0$; (c) a condition that the second DOWNHILL DETERMINATION flag F10 or DOWNHILL DETERMINATION flag F1 is set at "1"; and (d) a condition that the brake pedal has been depressed.

If an affirmative decision (YES) is obtained in step S11, the control flow goes to step S12 to set the DOWNHILL HIGH-SPEED POSITION INHIBIT flag F3 to "1". Step S12 is followed by step S13. If a negative decision (NO) is obtained in step S11, the control flow goes to step S13, while skipping step S12. Step S13 and the following steps are provided to inhibit the automatic transmission 14 from being placed in the fourth-speed position "4" if the UPHILL or DOWNHILL HIGH-SPEED POSITION INHIBIT flag F2 or F3 is set at "1" (if an affirmative decision is obtained in step S21 or S22), and to cancel the inhibition of the fourth-speed position by resetting the flag F2 or F3 to "0" (in step S16 or S20) after an UPHILL or DOWNHILL RUNNING CONTROL timer has been timed up (step S15 or S19), if the UPHILL or DOWNHILL DETERMINATION flag F0 or F1 is set at "0" (if an affirmative decision is obtained in step S13 or S17).

Described in detail, step S13 is provided to determine whether the UPHILL DETERMINATION flag F0 is set at "0". If an affirmative decision (YES) is obtained in step S13, the control flow goes to step S14 to determine whether the UPHILL HIGH-SPEED POSITION INHIBIT flag F2 is set at "1". If a negative decision (NO) is obtained in step S13 or S14, the control flow goes to step S17. If the flag F0 is set at "0" while the flag F2 is set at "1", the control flow goes to step S15 to determine whether the UPHILL RUNNING CONTROL timer has been timed up. This timer is reset and started to measure a time lapse after the conditions for initiating the uphill running control are satisfied or after the uphill running control is initiated. If a negative decision (NO) is obtained in step S15, the control flow goes to step S21 to determine whether the UPHILL HIGH-SPEED POSITION INHIBIT flag F2 is still set at "1". If an affirmative decision (YES) is obtained in step S21, the control flow goes to step S23 in which the inhibition to place the automatic transmission 14 in the fourth-speed position "4" is continued. If the UPHILL RUNNING CONTROL timer has been timed up, the control flow goes to step S16 to reset the UPHILL HIGH-SPEED POSITION INHIBIT flag F2 to "0", whereby the inhibition to place the automatic transmission 14 in the fourth-speed position (during uphill running of the vehicle) is cancelled and terminated.

Step S17 is provided to determine whether the DOWNHILL DETERMINATION flag F1 is set at "0". If an affirmative decision (YES) is obtained in step S17, the control flow goes to step S18 to determine whether the DOWNHILL HIGH-SPEED POSITION INHIBIT flag G3 is set at "1". If a negative decision (NO) is obtained in step S17 or in step S18, the control flow goes to step S21 If the flag F1 is set at "0" while the flag F3 is set at "1", the control flow goes to step S19 to determine whether the DOWNHILL RUNNING CONTROL timer has been timed up. This timer is reset and started to measure a time lapse after the conditions for initiating the downhill running control are satisfied or after the downhill running control is initiated. If a negative decision (NO) is obtained in step S19, the control flow goes to step S21. If a negative decision (NO) is obtained in step S21, the control flow goes to step S22 to determine whether the flag F3 is still set at "1". If an affirmative decision (YES) is obtained in step S22, the control flow goes to step S23 in which the inhibition to place the automatic transmission 14 in the fourth-speed position "4" is continued. If the DOWNHILL RUNNING CONTROL timer has been timed up, step S20 is implemented to reset the DOWNHILL HIGH-SPEED POSITION INHIBIT flag F3 is reset to "0", whereby the inhibition to place the automatic transmission 14 in the fourth-speed position (during downhill running of the vehicle) is cancelled and terminated.

In the present embodiment of the shift control apparatus for the automatic transmission 14, the engine output reduction determining means 106 (step S6-8) is adapted to determine reduction of the output of the engine 10, and the reference acceleration reducing means 108 (step S6-14) is adapted to determine the compensated reference acceleration value SBG43F if the reduction of the engine output is determined by the engine output reduction determining means 106. The compensated reference acceleration value SBG43F is smaller than the normal reference acceleration value SBG43 by the compensating amount α which decreases with an increase in the vehicle speed V except when the vehicle speed V is relatively low as explained above. Namely, the reference acceleration value SBG43 is reduced from the normal value used during running of the vehicle without the fuel cut control, to the compensated value SBG43F used during a coasting run on a downhill road with the fuel cut control. The fuel cut of the engine 10 results in reduction of the engine output. However, the influence of the fuel cut on the amount of reduction of the engine output decreases with an increase in the vehicle speed V. Accordingly, the compensating amount α by which the compensated reference acceleration value SBG43F is smaller than the normal value SBG43 is determined to decrease with the increase in the vehicle speed V. Therefore, the downhill determination value (SBG43F+KGBDF) used for determining the downhill running of the vehicle during the fuel cut control can be optimized to assure accurate determination of the downhill running of the vehicle, for thereby permitting adequate control of the speed ratio of the automatic transmission 14. The above fact also applies to vehicle running with an operation of an air conditioner compressor.

The present shift control apparatus further includes the first downhill determination acceleration determining means 112 (S6-17) for determining the first downhill determination acceleration value (SBG43F+KGBDF) on the basis of the compensated reference acceleration value SBG43F determined by the reference acceleration reducing means 108. The shift control apparatus further includes the first downhill running determining means 116 (S6-17) for determining downhill running of the vehicle when the actual acceleration value of the vehicle becomes larger than the downhill determination acceleration value determined by the first downhill determination acceleration determining means 112. The shift control apparatus also includes the downhill running control means 104 (S23) for inhibiting the automatic transmission 14 from being placed in the fourth-speed position "4", upon determination of the downhill running of the vehicle by the first downhill running determining means 116. If the determination of the downhill running takes place when the automatic transmission 14 is placed in the fourth-speed position, the downhill running control means 104 commands the shift control means 100 to shift down the automatic transmission 14 to the third-speed position "3", for increasing the engine braking effect during running of the vehicle on the downhill road. Thus, the automatic transmission 14 is shifted down to increase the engine braking effect, when it is determined that the actual vehicle acceleration value MOBG is larger than the downhill determination acceleration value (SBG43F+KGBDF) which is determined on the basis of the reference acceleration value SBG43F which is compensated by the reference acceleration reducing means 108. The present arrangement is effective to prevent an influence of the fuel cut of the engine 10 on the determination of the downhill running of the vehicle, and thereby provide an adequate engine braking effect during the downhill running of the vehicle with the fuel cut of the engine.

In the present embodiment, the downhill gradient determining means 110 (S6-14) is also provided to determine the compensated downhill gradient value KGBDF if the engine output reduction is determined by the engine output reduction determining means 106. The compensated downhill gradient value KGBDF is larger than the normal downhill gradient value KGBD by the compensating amount α which decreases with an increase in the vehicle speed V, like the compensating amount α for the compensated reference acceleration value SBG43F. That is, the compensated downhill gradient value KGBDF is equal to (KGBD+a). The compensated reference acceleration value SBG43F obtained by the reference acceleration reducing means 108 and the compensated downhill gradient value KGBDF obtained by the downhill gradient determining means 110 are used by the first downhill determination acceleration determining means 112 for determining the downhill determination acceleration value (SBG43F+KGBDF) which is used for determining the downhill running of the vehicle when the engine output is reduced. Therefore, the downhill determination acceleration value (SBG43F+KGBDF) used upon engine output reduction due to the fuel cut during running of the vehicle at a given running speed V is the same as that (SBG43+KGBD) used during running of the vehicle at the same running speed V without the engine output reduction, whereby the accuracy of determination of the downhill running of the vehicle is not deteriorated even in the event of the engine output reduction.

Figure 10:
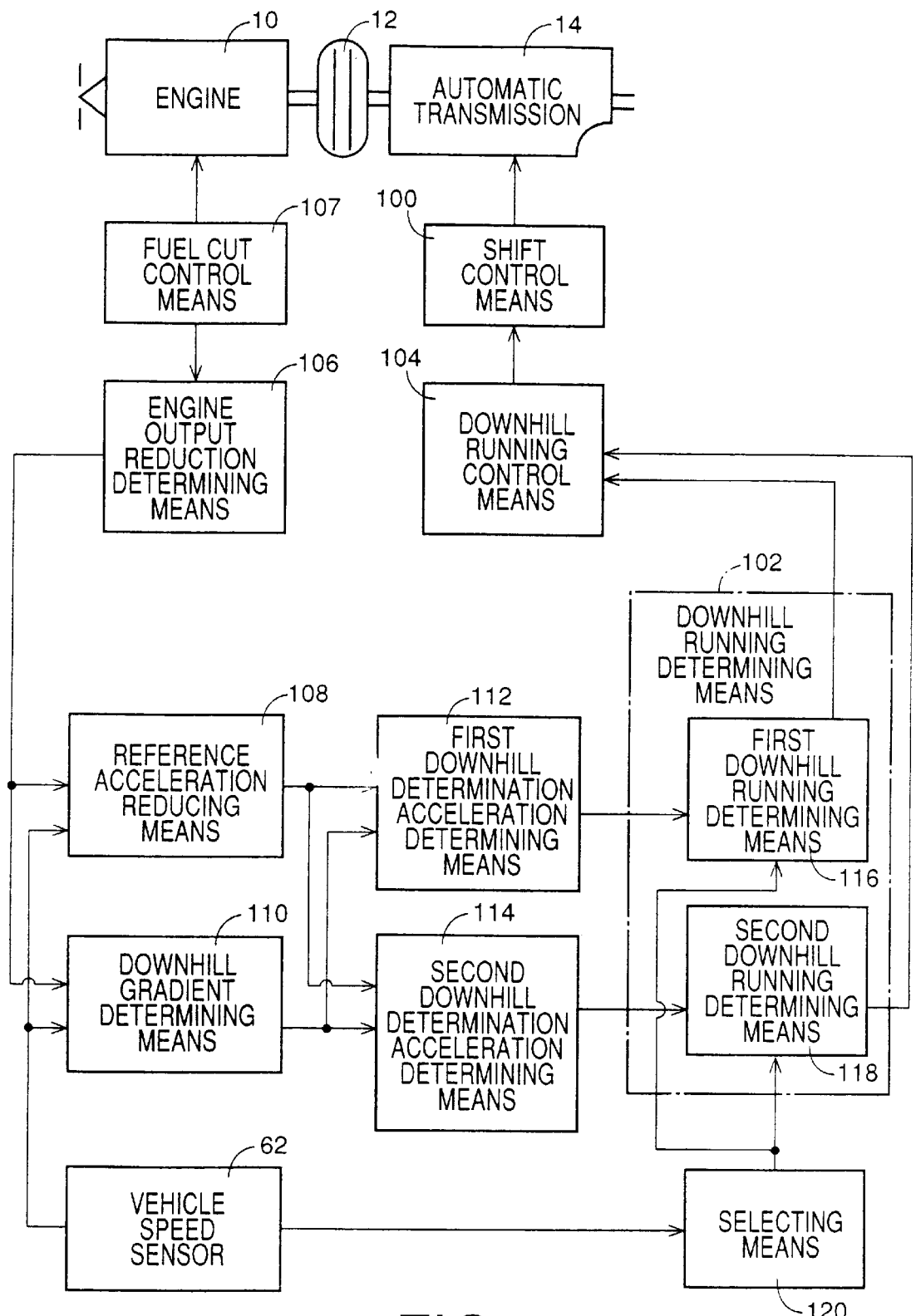
FIG. 10 is a functional block diagram corresponding to that of FIG. 4, showing a second embodiment of the present invention.
Figure 11:
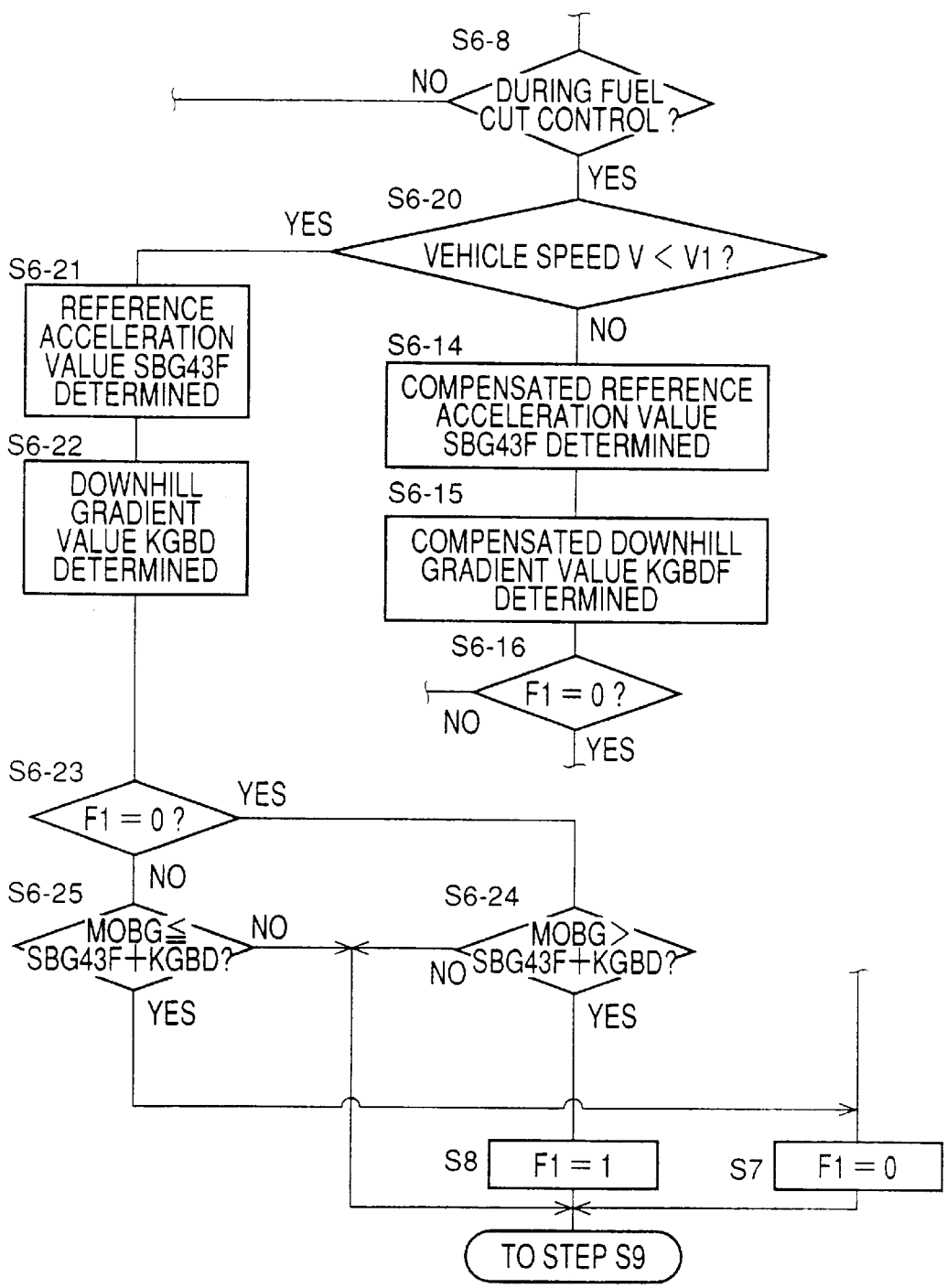
FIG. 11 is a flow chart illustrating a part of a downhill road determining sub-routine used in the second embodiment of FIG. 10.

Referring to FIGS. 10 and 11, there will be described a second embodiment of this invention. In the second embodiment, the same reference numerals and signs as used in the first embodiment are used to identify the corresponding elements. In the interest of simplification, these elements of the second embodiment will not be described.

The shift control apparatus constructed according to the second embodiment further includes second downhill determination acceleration determining means 114, second downhill running determining means 118 and selecting means 120, as shown in the block diagram of FIG. 10.

The second downhill determination acceleration determining means 114 is adapted to determine second downhill determination acceleration value (SBG43F+KGBD), on the basis of the compensated reference acceleration value SBG43F determined by the reference acceleration reducing means 108 and the normal downhill gradient value KGBD determined by the downhill gradient determining means 110.

In the present embodiment, the downhill running determining means 102 includes second downhill running determining means 118, in addition to the first downhill running determining means 116 for determining downhill running of the vehicle if the actual acceleration value MOBG of the vehicle is larger than the downhill determination acceleration value (SBG43F+KGBDF) determined by the first downhill determination acceleration determining means. The second downhill running determining means 118 is adapted to determine the downhill running of the vehicle if the actual acceleration value MOBG is larger than the downhill determination acceleration value (SBG43F+ KGBD) determined by the second downhill determination acceleration determining means 114.

The selecting means 120 is adapted to select one of the first downhill running determining means 116 and the second downhill running determining means 118, depending upon whether the vehicle speed V is higher than a predetermined threshold, namely, depending upon whether the vehicle speed V is in a high range whose lower limit is the threshold, or in a low range whose upper limit is the threshold. The selecting means 120 selects the first downhill running determining means 116 if the vehicle speed V is in the high range, and selects the second downhill running determining means 118 if the vehicle speed V is in the low range.

The shift control apparatus according to the second embodiment is adapted to execute a downhill running determining sub-routine a part of which is illustrated in the flow chart of FIG. 11. The sub-routine of FIG. 11 is identical with the sub-routine of FIG. 6, except for the addition in the sub-routine of FIG. 11 of step S6-20 which is inserted between steps S6-8 and S6-14, and steps S6-21 through S6-25 which are implemented before steps S7–S9, if an affirmative decision is obtained in step S6-20.

Step S6-20 corresponding to the selecting means 120 of FIG. 10 is provided to determine whether the vehicle speed V is lower than a predetermined threshold V1. This threshold V1 is a lower limit of a high range of the vehicle speed V in which the engine braking effect produced by the fuel cut of the engine 10 has a relatively small influence on the acceleration value of the vehicle. The threshold V1 is an upper limit of a low range of the vehicle speed V. For instance, the threshold V1 is determined to be about 40 km/h. If a negative decision (NO) is obtained in step S6-20, it means that the vehicle speed V is in the high range. In this case, the control flow goes to step S6-14 and the following steps, whereby the determination of downhill running of the vehicle during the fuel cut is effected on the basis of the downhill determination acceleration value (SBG43F+KGBDF) determined by the first downhill determination acceleration determining means 112. If an affirmative decision (YES) is obtained in step S6-20, it means that the vehicle speed V is in the low range. In this case, the control flow goes to steps S6-21 through S6-25, which will be described.

In step S6-21 corresponding to the reference acceleration reducing means 108, the compensated reference acceleration value SBG43F used during running of the vehicle with the automatic transmission 14 placed in the third-speed or fourth-speed position and with the fuel cut of the engine 10 is determined on the basis of the detected throttle opening angle TA (0%) and vehicle speed V and according to the predetermined relationship indicated by the broken line in FIG. 7, which relationship corresponds to the currently established third-speed or fourth-speed position of the automatic transmission 14. Step S6-21 is followed by step S6-22 corresponding to the downhill gradient determining means 110, in which the normal downhill gradient value KGBD is determined on the basis of the detected vehicle speed V and currently established operating position of the automatic transmission 14 and according to the predetermined relationship of FIG. 8, which relationship is formulated to be used during coasting of the vehicle with the throttle valve 58 placed in the engine idling position.

Step S6-22 is followed by step s6-23 determine whether the DOWNHILL DETERMINATION flag F1 is set at "1". If an affirmative decision (YES) is obtained in step S6-23, the control flow goes to step S6-24 to determine the downhill determination acceleration value (SBG43F+KGBD) on the basis of the compensated reference acceleration value SBG43F and the normal downhill gradient value KGBD, and to determine whether the actual acceleration value MOBG is larger than the determined downhill determination acceleration value (SBG43F+KGBD). Step S6-24 corresponds to the second downhill determination acceleration determining means 114 for determining the downhill determination acceleration value (SBG43F+KGBD), and also corresponds to the second downhill running determining means 118 for determining the downhill running of the vehicle if the actual acceleration value MOBG is larger than the downhill determination acceleration value (SBG43F+KGBD).

If a negative decision (NO) is obtained in step S6-24, it means that the vehicle is not running on a downhill road. In this case, the control flow goes to step S9 and the following steps. If an affirmative decision (YES) is obtained in step S6-24, it means that the vehicle is running on a downhill road, and the control flow goes to step S8 to set the DOWNHILL DETERMINATION flag F1 to "1", and then to step S9 and the following steps. If a negative decision (NO) is obtained in step S6-23, that is, if the DOWNHILL DETERMINATION flag F1 is already set at "1", the control flow goes to step S6-25 to determine whether the actual acceleration value MOBG is equal to or smaller than the downhill determination acceleration value (SBG43F+KGBD). If a negative decision (NO) is obtained in step S6-25, the control flow goes to step S9 and the following steps, whereby the flag F1 remains to be set at "1". If an affirmative decision (YES) is obtained in step S6-25, it means that the vehicle is no longer running on a downhill road. In this case, the control flow goes to step S7 to reset the flag F1 to "0".

The present second embodiment provides the following advantages in addition to the advantages described above with respect to the first embodiment. That is, the second downhill determination acceleration determining means 114 (step S6-24) is provided to determine the downhill determination acceleration value (SBG43F+KGBD) on the basis of the compensated reference acceleration value SBG43F determined by the reference acceleration reducing means 108 (S6-21) and the normal downhill gradient value KGBD determined by the downhill gradient determining means 110 (S6-22). Further, the second running determining means 118 (S6-24) is provided to determine the downhill running of the vehicle if the actual acceleration value MOBG is larger than the downhill determination acceleration value (SBG43F+KGBD) determined by the second downhill determination acceleration determining means 114. The downhill determination acceleration value (SBG43F+KGBD) used by the second downhill running determining means 118 when the vehicle speed V is in the low range is smaller than the downhill determination acceleration value (SBG43F+KGBDF) used by the first downhill running determining means 116 when the vehicle speed V is in the high range. However, the downhill gradient value KGBD used during running of the vehicle at a given speed V with engine output reduction (fuel cut control) is the same as used during running of the vehicle at the same speed V without the engine output reduction. This arrangement is effective to avoid unexpected downhill running control at different gradient values of a downhill road.

Figure 12:
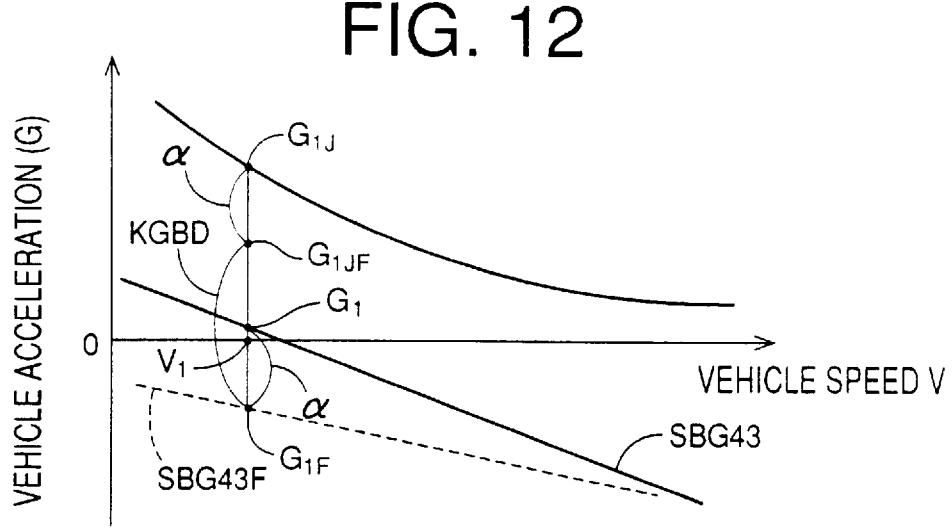
FIG. 12 is a view for explaining a manner of determining a downhill road in the sub-routine of FIG. 11.

In an example of FIG. 12 in which the vehicle running speed V is V1, the DOWNHILL DETERMINATION flag F1 is set to "1" in step S8 if it is determined in step S6-24 that the actual acceleration value MOBG is larger than the downhill determination acceleration value $G_{1JF}$=(SBG43F+KGBD) corresponding to the vehicle speed V1. The compensated reference acceleration value $G_{1F}$=SBG43F during the fuel cut control at the vehicle speed V1 is smaller than the normal reference acceleration value $G_1$=SBG43 during normal coasting of the vehicle without the fuel cut control, by the compensating amount α which corresponds to the engine braking effect produced by the fuel cut. The compensated reference acceleration value $G_{1F}$ is a negative value. On the other hand, the downhill gradient value KGBD used during coasting of the vehicle at a given speed V with the fuel cut control is the same as that used during normal coasting of the vehicle without the fuel cut control. Therefore, the determination of the downhill running of the vehicle is not influenced by the fuel cut control.

Further, the second embodiment further includes the selecting means 118 (S6-20) for selecting the first downhill running determining means 116 when the vehicle speed V is in the high range, and the second downhill running determining means 118 when the vehicle speed V is in the low range. That is, the first downhill running determining means 116 is used when the vehicle speed V is relatively high, because the fuel cut of the engine 10 causes a relatively small amount of reduction of the engine output when the vehicle speed is relatively high. Conversely, the second downhill running determining means 118 is used when the vehicle speed V is relatively low, because the fuel cut causes a relatively large amount of reduction of the engine output when the vehicle speed is relatively low.

While the presently preferred embodiments of this invention have been described above by reference to the accompanying drawings, for illustrative purpose only, it is to be understood that the invention is not limited to the details of the illustrated embodiments, but may be otherwise embodied.

Figure 4:
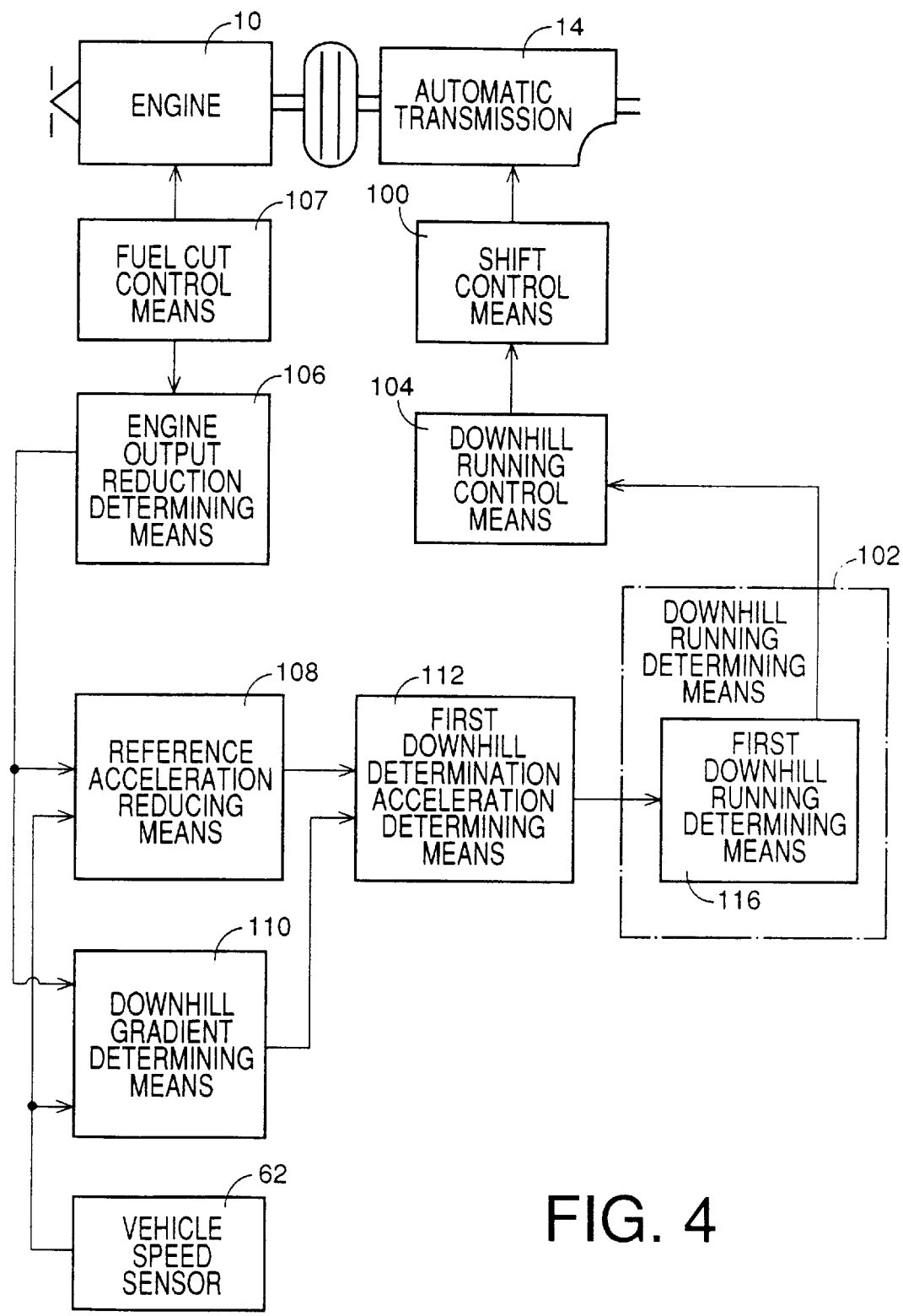
FIG. 4 is a functional block diagram illustrating the functions of various functional means incorporated in engine and transmission controllers of the control system of FIG. 3.

For example, the first embodiment of FIG. 4 may be modified so as to replace the first downhill determination acceleration determining means 112 and the first downhill running determining means 116 by the second downhill determination acceleration determining means 114 and the second downhill running determining means 118 which are provided in the second embodiment of FIG. 10.

Figure 13:
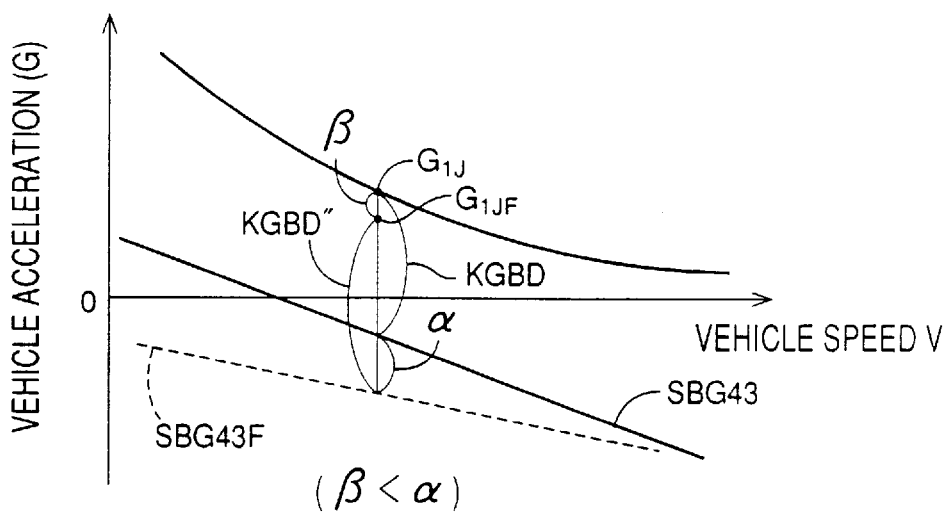
FIG. 13 is a view for explaining a manner of determining a downhill road in a third embodiment of this invention.

Further, the downhill gradient value KGBD or KGBDF used in the first and second embodiments may be replaced by a downhill gradient value KGBD", which is larger than the normal downhill gradient value KGBD and smaller than the compensated downhill gradient value KGBDF, as indicated in FIG. 13. In this case, the first or second downhill running determining means 116, 118 is modified to determine downhill running of the vehicle with the fuel cut if the actual vehicle acceleration value MOBG is larger than a downhill determination acceleration value (SBG43F+ KGBD") which is a sum of the compensated reference acceleration value SBG43F and the gradient value KGBD".

Figure 14:
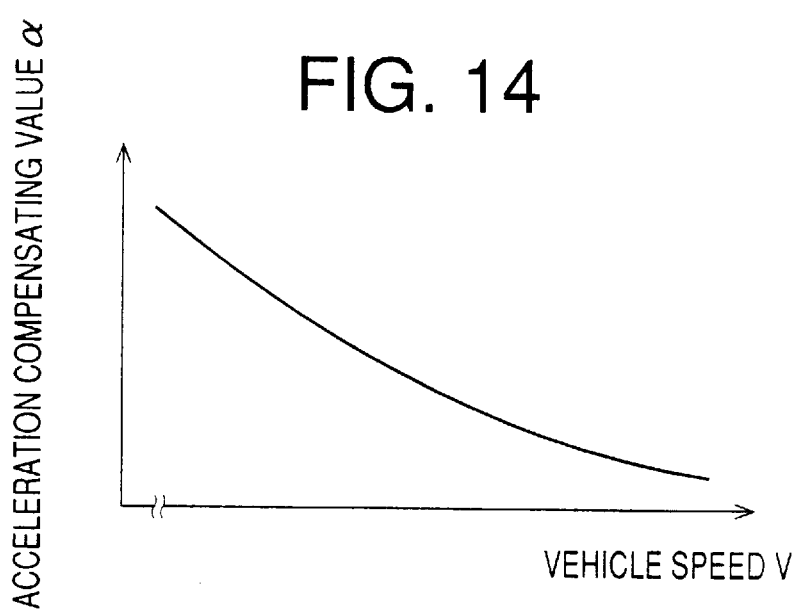
FIG. 14 is a view indicating a relationship for obtaining a compensated vehicle acceleration value α used to reduce reference acceleration value, in a fourth embodiment of the invention.

In the first and second embodiments, the reference acceleration reducing means 108 is adapted to determine the compensated reference acceleration value SBG43F on the basis of the detected vehicle speed V and according to the relationship between the vehicle speed V and the value SBG43F as indicated by the broken line in FIG. 7. However, the compensated reference acceleration value SBG43F may be obtained by subtracting the compensating amount α from the normal reference acceleration value SBG43 obtained on the basis of the detected vehicle speed V and according to the relationship indicated by the solid lines in FIG. 7. In this case, the compensating amount α is obtained on the basis of the detected vehicle speed V and according to a predetermined relationship between the vehicle speed V and the compensating amount α, as indicated in FIG. 14.

In the illustrated embodiments, the downhill running control means 104 is adapted such that the automatic transmission 14 is prevented in step S23 from being placed in the fourth-speed position "4", upon determination of downhill running of the vehicle. However, the downhill running control means 104 may be adapted to control the automatic transmission 14 according to downhill shift patterns which are different from the normal shift patterns used during running of the vehicle on a flat road surface.

In the illustrated embodiments, the engine output reduction determining means 106 is adapted to determine in step S6-8 whether the fuel cut of the engine 10 is effected during coasting of the vehicle with the idling position switch being on (with the throttle valve 58 being placed in the engine idling position). However, the engine output reduction determining means 106 may be adapted to determine whether an auxiliary or optional device whose operation reduces the engine output is in operation or not. A compressor of an air condition is an example of such an auxiliary device other than the fuel cut control means 107. In this case, the throttle opening angle TA need not be zero (idling position switch need not be on) to initiate the downhill running control by the downhill running control means 104, and the determination of downhill running of the vehicle is effected on the basis of the compensated reference acceleration value SBG43F or downhill determination acceleration value (SBG43F+KGBDF) or (SBG43F+KGBD) which is determined depending upon the throttle opening angle TA, as indicated by the solid lines in FIG. 7.

While the downhill running determining means 102 in the illustrated embodiments determines whether the actual vehicle deceleration value MOBG is larger than the downhill determination acceleration value (SBG43F+KGBDF) or (SBG43F+KGBD), the downhill running determining means 102 may be adapted to determine whether the actual acceleration value MOBG minus the downhill gradient value KGBDF or KGBD is larger than the downhill determination acceleration value. In essence, this determination may be considered to be the determination whether the actual acceleration value MOBG is larger than the downhill determination acceleration value (SBG43F+KGBDF) or (SBG43F+KGBD).

Although the shift control apparatus of the illustrated embodiments is adapted to control the automatic transmission 14 having four forward drive positions, the shift control apparatus may be adapted to control an automatic transmission having two or three forward drive positions or five or more forward drive positions. If the automatic transmission has five forward drive positions, the downhill running control means 104 is arranged to shift down the automatic transmission from the fifth-speed position to the fourth-speed position upon determination of the downhill running of the vehicle with the automatic transmission placed in the fifth-speed position.

While the throttle opening angle TA is used in the illustrated embodiments as a parameter indicative of an engine load or a currently required output of the engine, other parameters such as the amount of operation of the accelerator pedal 56, or the amount of fuel injection or intake air quantity of the engine 10.

It is to be understood that the invention may be embodied with various other changes, modifications and improvements which may occur to those skilled in the art, without departing from the spirit and scope of the invention defined in the following claims:

What is claimed is:

1. A shift control apparatus for controlling a speed ratio of an automatic transmission of a motor vehicle having an engine and an accelerator pedal, during running of the vehicle on a downhill road, on the basis of an actual acceleration value of the vehicle as compared with a reference acceleration value of the vehicle, said shift control apparatus comprising:

engine output reduction determining means for determining reduction of an actual output of said engine with respect to a desired output of the engine as represented by an operating amount of said accelerator pedal; and reference acceleration reducing means for reducing said reference acceleration value by a compensating amount which decreases with an increase in a running speed of the vehicle, if the engine output reduction determining means has determined the reduction of said actual output of the engine.

2. A shift control apparatus according to claim 1, further comprising:

downhill determination acceleration determining means for determining a downhill determination acceleration value on the basis of the reference acceleration value of the vehicle determined by the reference acceleration reducing means;

downhill running determining means for determining that the vehicle is running on said downhill road, if the actual acceleration value of the vehicle is larger than said downhill determination acceleration value determined by said downhill determination acceleration determining means; and downhill running control means for controlling the speed ratio of the automatic transmission, so as to increase an effect of an engine brake application to the vehicle, if said downhill running determining means has determined that the vehicle is running on said downhill road.

3. A shift control apparatus according to claim 1, wherein said reference acceleration reducing means obtains a compensated reference acceleration value by reducing said reference acceleration value by said compensating amount, said shift control apparatus further comprising:

downhill gradient determining means for determining a downhill gradient value on the basis of the running speed of the vehicle and according to a predetermined relationship between the running speed of the vehicle and said downhill gradient value, if said engine output reduction determining means has determined the reduction of the actual output of the engine;

first downhill determination acceleration determining means for determining a downhill determination acceleration value on the basis of said compensated reference acceleration value obtained by said reference acceleration reducing means and said downhill gradient value determined by said downhill gradient determining means; and first downhill running determining means for determining that the vehicle is running on said downhill road, if the actual acceleration value of the vehicle is larger than said downhill determination acceleration value determined by said first downhill determination acceleration determining means.

4. A shift control apparatus according to claim 3, wherein said downhill gradient determining means determines a normal downhill gradient value when the reduction of the actual output of the engine is not determined by said engine output reduction determining means, and determines a compensated downhill gradient value when the reduction of the actual output of the engine is determined by said engine output reduction determining means, said compensated downhill gradient value being larger than said normal downhill gradient value by a compensating amount which decreases with an increase in said running speed of the vehicle.

5. A shift control apparatus according to claim 4, further comprising:

second downhill determination acceleration determining means for determining a downhill determination acceleration value on the basis of said compensated reference acceleration value obtained by said reference acceleration reducing means and said normal downhill gradient value determined by said downhill gradient determining means; and second downhill running determining means for determining that the vehicle is running on said downhill road, if the actual acceleration value of the vehicle is larger than said downhill determination acceleration value determined by said second downhill determination acceleration determining means.

6. A shift control apparatus according to claim 5, further comprising selecting means for determining whether the running speed of the vehicle is higher a predetermined threshold, said selecting means selecting said first downhill running determining means for enabling said first downhill running determining means if the running speed is higher than said threshold, and selecting said second downhill running determining means for enabling said second downhill running determining means if the running speed is not higher than said threshold.

7. A shift control apparatus according to claim 1, wherein said engine output reduction determining means determines whether the actual output of the engine is reduced, by determining whether a fuel cut of the engine is effected.

8. A shift control apparatus according to claim 1, further comprising downhill running control means for preventing said automatic transmission from being placed in a highest-gear forward drive position thereof, if said downhill running determining means has determined that the vehicle is running on said downhill road.

* * * * *